(12) United States Patent
Lee

(10) Patent No.: US 8,869,304 B1
(45) Date of Patent: Oct. 21, 2014

(54) DIGITAL RIGHTS MANAGEMENT BASED CONTENT ACCESS MEDIATION

(75) Inventor: Wing K. Lee, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 2017 days.

(21) Appl. No.: 11/870,134

(22) Filed: Oct. 10, 2007

(51) Int. Cl.
*H04L 29/06* (2006.01)

(52) U.S. Cl.
USPC .............................. 726/29; 713/154; 713/161

(58) Field of Classification Search
USPC .............................. 725/62–63; 380/200, 210; 709/201–203, 208–211
See application file for complete search history.

(56) References Cited

U.S. PATENT DOCUMENTS

| | | | | |
|---|---|---|---|---|
| 7,440,573 B2* | 10/2008 | Lor et al. | ...................... | 380/270 |
| 7,684,438 B2* | 3/2010 | Stephens et al. | .............. | 370/466 |
| 7,747,724 B2* | 6/2010 | Wallis et al. | .................. | 709/223 |
| 8,386,942 B2* | 2/2013 | Barsook et al. | .............. | 715/764 |
| 8,577,334 B1* | 11/2013 | Smith et al. | .................... | 455/410 |
| 2001/0056404 A1* | 12/2001 | Kuriya et al. | .................... | 705/51 |
| 2002/0038425 A1* | 3/2002 | Kanno | .......................... | 713/185 |
| 2002/0065932 A1* | 5/2002 | Kobayashi | ................... | 709/233 |
| 2002/0147840 A1* | 10/2002 | Mutton et al. | ................. | 709/239 |
| 2002/0157002 A1* | 10/2002 | Messerges et al. | ........... | 713/155 |
| 2002/0199009 A1* | 12/2002 | Willner et al. | ................. | 709/231 |
| 2003/0063072 A1* | 4/2003 | Brandenberg et al. | ........ | 345/173 |
| 2003/0095524 A1* | 5/2003 | Stephens et al. | .............. | 370/338 |
| 2003/0099221 A1* | 5/2003 | Rhee | ............................. | 370/338 |
| 2003/0182390 A1* | 9/2003 | Alam | ............................ | 709/216 |
| 2003/0191719 A1* | 10/2003 | Ginter et al. | .................... | 705/54 |
| 2004/0024764 A1* | 2/2004 | Hsu et al. | .......................... | 707/9 |
| 2004/0032393 A1* | 2/2004 | Brandenberg et al. | ........ | 345/156 |
| 2004/0068668 A1* | 4/2004 | Lor et al. | ...................... | 713/201 |
| 2005/0176407 A1* | 8/2005 | Tuomi et al. | .................. | 455/411 |
| 2005/0204046 A1* | 9/2005 | Watanabe | ..................... | 709/228 |
| 2006/0053209 A1* | 3/2006 | Li | ................................. | 709/217 |
| 2006/0229936 A1* | 10/2006 | Cahill | ............................ | 705/14 |
| 2007/0297426 A1* | 12/2007 | Haveson et al. | ............. | 370/401 |

\* cited by examiner

*Primary Examiner* — Kambiz Zand
*Assistant Examiner* — Phy Anh Vu

(57) ABSTRACT

Computer implemented methods and systems are provided for mediating access to content based on digital rights management. A request is received from a mobile device for a unit of content. A digital rights holder identity is identified for the mobile device by using a unique identifier for the mobile device. The unique identifier is an equipment identifier, an international mobile subscriber identity, a mobile subscriber identification number, or a mobile identification number. Whether the digital rights holder identity is associated with a right to receive the unit of content is determined. The unit of content is provided to the mobile device in response to a determination that the digital rights holder identity is associated with the right to receive the unit of content.

20 Claims, 5 Drawing Sheets

DIGITAL RIGHTS MANAGEMENT BASED CONTENT ACCESS MEDIATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A consumer can purchase a digital video disc (DVD) of a favorite video that the consumer may watch at home on a DVD player for a personal computer (PC). The consumer can also pay to download a favorite song or audio file to a digital music player via the PC, and may listen to the downloaded audio on the digital music player. Additionally, the consumer can use a mobile phone or other portable electronic device to download videos to watch on the mobile phone and can use the mobile phone to download music to listen to on the mobile phone.

SUMMARY

The present disclosure provides computer implemented methods and systems for managing digital rights. In some method embodiments, a request is received from a mobile device for a unit of content. A digital rights holder identity is identified for the mobile device by using a unique identifier for the mobile device. The unique identifier is an equipment identifier, an international mobile subscriber identity, a mobile subscriber identification number, or a mobile identification number. Whether the digital rights holder identity is associated with a right to receive the unit of content is determined. The unit of content is provided to the mobile device in response to a determination that the digital rights holder identity is associated with the right to receive the unit of content.

In some system embodiments, a server is configured to receive a request from a media player for a unit of content and identify a digital rights holder identity associated with the request by using a unique identifier for the mobile device. The unique identifier is an equipment identifier, an international mobile subscriber identity, a mobile subscriber identification number, or a mobile identification number. The server is also configured to determine whether the digital rights holder identity is associated with a right to receive the unit of content. Additionally, the server is configured to provide the unit of content to the media player in response to a determination that the digital rights holder identity is associated with the right to receive the unit of content.

In some other method embodiments, a distribution repository provides a unit of content to a server. The server stores the unit of content. The server also receives a request for the unit of content from a mobile device via a communication network. Additionally, the server provides the unit of content to the mobile device based on a digital rights holder identity.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
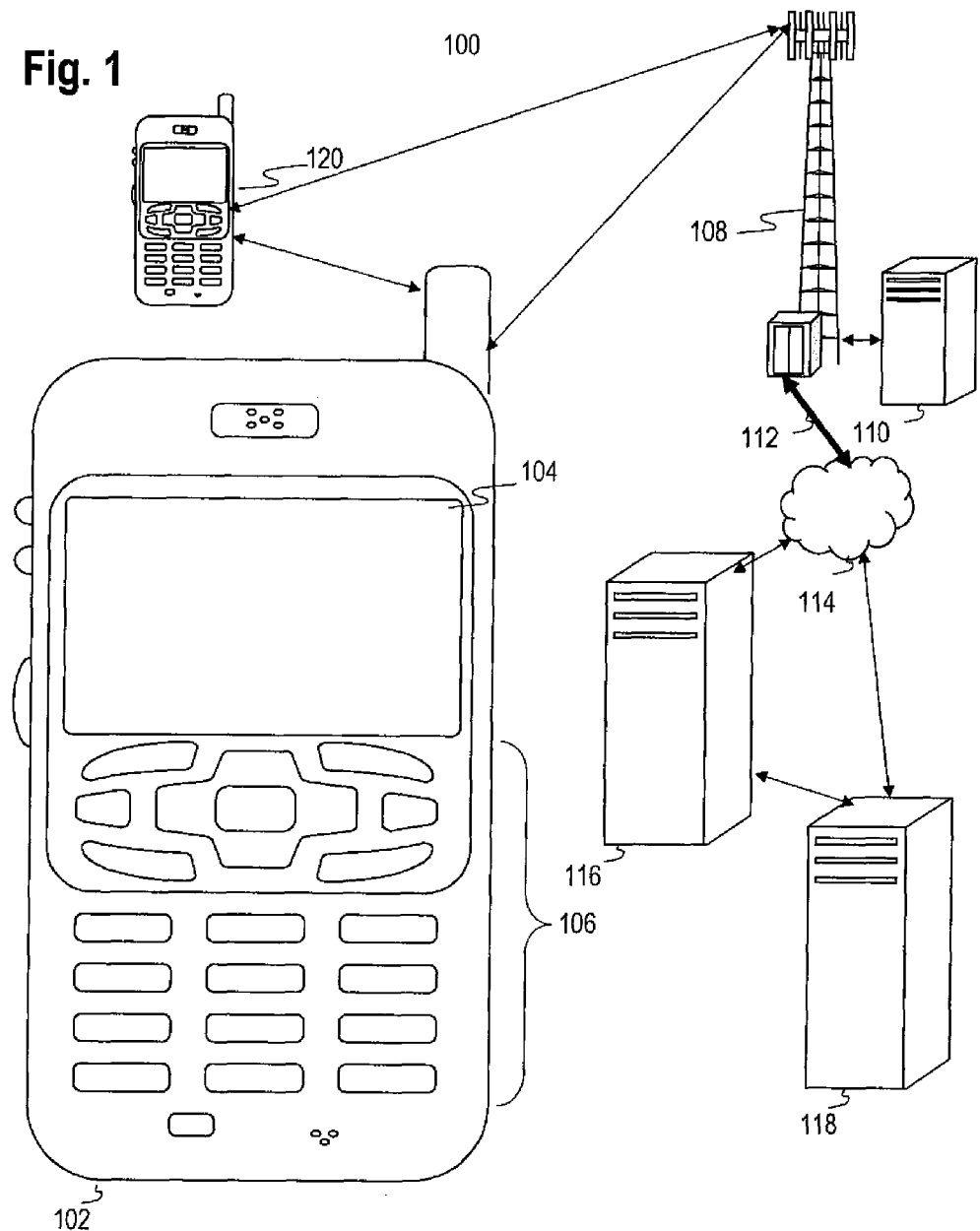
FIG. 1 shows a wireless communications system for mediating access to content based on digital rights management according to some embodiments of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure provides computer implemented methods and systems for mediating access to content based on digital rights management (DRM) techniques. Rather than a consumer taking previously purchased media content, for example DVDs and CDs, everywhere that the consumer goes, the consumer may use a mobile device to access the previously purchased content from a server that stores the content. Alternatively, the consumer may have previously purchased the content from the server that continues to store the content for the consumer, such that the consumer did not have either a DVD or a CD that embodied the content. When a server receives a request for content from a mobile device, the server uses unique software and/or hardware identifiers on the mobile device to identify the consumer. The server compares the request to the consumer's digital rights, and provides the requested content if the server determines that the consumer has the digital rights to receive the content. The consumer's digital rights may limit the consumer to using the content on only one device at a time, or the consumer's digital rights may enable the consumer and family members of the consumer to use the content on multiple devices simultaneously. Due to the flexibility offered by such a service provided for the mobile device, the consumer is likely to continue subscribing to the service provider.

Rather than requesting content from a distribution repository over a physical line each time that the content is requested by a mobile device, which can be expensive using leased lines for backhauling the content, a server may request content once from the distribution repository and store the content in advance of requests from mobile devices, based on predictive analysis. Instead of incurring expenses for providing content over leased lines every time that the content is provided, the content may be provided only once over the leased lines to the server, such that the server can subsequently provide the content as requested, without incurring any further leased line expenses. When the server in this example receives a request for content from a mobile device, the server already has the content, and does not have to fetch the content from the distribution repository, thereby reducing network traffic congestion and possibly reducing expenses of leased lines. The server responds to such requests by providing the content to the mobile device based on a digital rights holder identity. If the server is too busy currently to provide the content to the mobile device, or if the server does not have a copy of the content but another wirelessly accessible device in the same area has a copy of the content, the server may identify the other wirelessly accessible device in the same area that has the requested content and enable the mobile device to receive the requested content from the other wirelessly accessible device.

FIG. 1 shows a wireless communications system 100 suitable for implementing several embodiments of the present disclosure. The wireless communication system 100 includes an illustrative mobile device 102. Though illustrated as a mobile phone, the mobile device 102 may take various forms including a personal digital assistant (PDA), a mobile computer, a digital camera, a mobile telecommunication device, a digital music player, a mobile handset, a handheld gaming device, a wireless mobile device, a pager, a portable computer, a tablet computer, a laptop computer, a set top box, a television, and a digital calculator. Suitable mobile devices may combine some or all of these functions.

The mobile device 102 includes a display 104 and a touch-sensitive surface or keys 106 with which the user can also interact. The mobile device 102 may present options for the user to select, controls for the user to actuate, and/or cursors or other indicators for the user to direct. The mobile device 102 may further accept data entry from the user, including numbers to dial or various parameter values for configuring the operation of the mobile device 102. The mobile device 102 may further execute one or more software or firmware applications in response to user commands. Among the various applications executable by the mobile device 102 are a media player, which enables the mobile device 102 to present various forms of content to a user, including multimedia content, audio content, video content, still image content, and text content. These applications may configure the mobile device 102 to perform various customized functions in response to user interaction, such as playing music or a video.

The content may be obtained via wireless communications with a cell tower 108, a wireless network access node, or another wireless communications network or system. The content may be stored on a cell tower server 110. The cell tower 108 (or wireless network access node) is coupled via a communication link 112 to a telecommunication network 114, such as the Internet. The communication link 112 may be a leased line, such as a physical cable, that provides access to the telecommunication network 114. While one cell tower is shown in FIG. 1, other cell towers could be present. The cell tower 108 may also be referred to as a base transceiver station (BTS). Via the wireless link and the wired network, the mobile device 102 has access to information on various servers, such as a network service server 116. The network service server 116 may provide content that may be shown on the display 104. The network service server 116 may be located in the general area of the cell tower 108 and communicate with the cell tower 108 by wireless or wired communication. Alternatively, the network service server 116 may be located remote from the cell tower 108.

The network service server 116 in turn interacts with a distribution repository 118 server via wired communication. The network service server 116 may act as a gateway to the distribution repository 118, which provides information such as content to transmit to the mobile device 102. Additionally, the distribution repository 118 may communicate directly through the telecommunication network 114. The mobile device 102 may communicate with the distribution repository 118 via the network service server 116, the network 114, and the cell tower 108 by a standard wireless telephony protocol (such as code division multiple access (CDMA), global system for mobile communication (GSM), universal mobile telecommunications system (UMTS), and worldwide interoperability for microwave access (WiMAX)), a wireless internet connection, or some other means of wireless communication. The mobile device 102 may also communicate with another device 120, which may be another mobile device 102, a desktop computer, or other device configured to present content.

Figure 2:
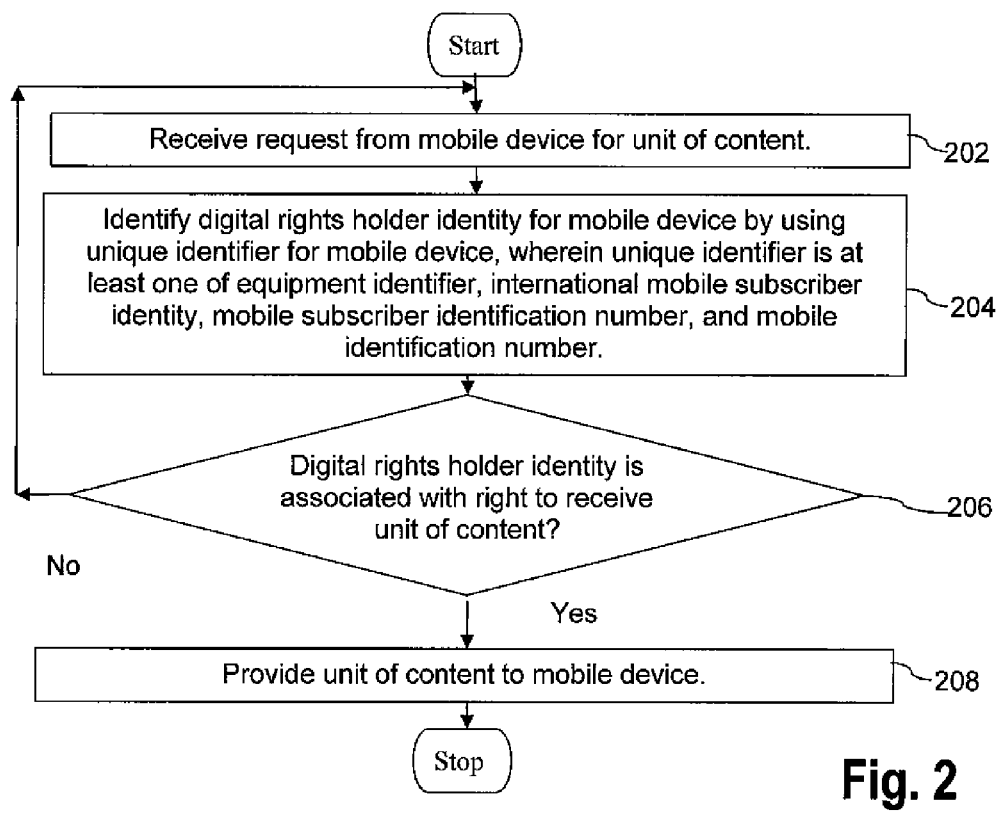
FIG. 2 shows a flowchart of a method for mediating access to content based on digital rights management according to some embodiments of the present disclosure.

FIG. 2 is a flowchart illustrating a method for mediating access to content based on digital rights management according to some embodiments of the present disclosure. The network service server 116 may execute the method to receive a request from a media player, which may be installed on the mobile device 102 or may be installed on some other device, for content and provide the requested content to the media player if a digital rights holder identity is associated with the right for the mobile device 102 to receive the content.

In box 202, a request is received from a mobile device for a unit of content. For example, the network service server 116 receives a request from the media player on the mobile device 102 for a video. The unit of content may be a multimedia content, an audio content, a video content, a still image content, or text content. The network service server 116 and the mobile device 102 may communicate via a base transceiver station, such as the cell tower 108.

In box 204, a digital rights holder identity is identified for the mobile device. For example, the network service server 116 identifies a digital rights holder identity for the mobile device 102 by using a unique identifier for the mobile device 102. The unique hardware identifier for the mobile device 102, may be an equipment identifier (EID), an international mobile subscriber identity (IMSI), a mobile subscriber identification number (MSIN), a mobile identification number (MIN), a combination of unique software and hardware identifiers, or a password associated with a digital rights holder. The EID is a cellular radio unique identifier for a specific piece of equipment. The IMSI is a unique number associated with all global system for mobile communications (GSM) and universal mobile telecommunications system (UMTS) network mobile phone users. The IMSI is stored in a subscriber identity module (SIM) inside a mobile phone and is sent by the phone to a communication network. The IMSI is usually 15 digits long, but can be shorter. The first 3 digits are the mobile country code, and are followed by the mobile network code (MNC), either 2 digits (European standard) or 3 digits (North American standard). The remaining digits are the MSIN within the network's customer base. The MIN is a 10-digit unique number that a wireless operator uses to identify a mobile phone. The unique identifiers are associated with the identity of the mobile device 102, such as the name and billing information of the individual who purchased the mobile device 102.

In box 206, whether the digital rights holder identity is associated with a right to receive the unit of content is determined. For example, the network service server 116 compares the request for the video to the digital rights associated with the digital rights holder's identity. In an embodiment, definitions or descriptions of digital rights to content may be stored in a database (not shown) accessible to the network service server 116. The digital rights holder identity may be used as a key to search the database for all definitions of digital rights to content associated with the digital rights holder identity. In an embodiment, a digital right to one item of content may be stored in the database as a pair or tuple of data comprising a content identifier and a definition of the digital rights to that content associated with the digital rights holder identity. For example, digital rights holder identity 678392A7K32 may be associated with 20 content identifier-digital rights definition tuples in the database. One of these tuples may comprise a content identifier "The Song of Roland" and the linked digital rights definition may be "unlimited."

The digital rights holder identity may be associated with a number of other devices, such as a mobile phone, a digital music player, a set-top box, a digital video recorder, a digital video player, a portable digital music player, a portable digital video player, and a PC with a DVD player. Each of the other devices may communicate via wireless or wired communication with either the cell tower server 110 or the network service server 116 through the telecommunication network 114. Data associated with the digital rights holder identity may restrict the use of any content to a maximum number of devices at one time. For example, the digital rights holder may have purchased the rights to watch the video on only one device at any time. In this example, if the digital rights holder watches the video on one device, the media player, the digital rights holder's children at home do not have the right to watch the video on any of the other devices, such as the PC with the DVD player. If the digital rights holder is concerned about avoiding such a limitation, the digital rights holder may purchase the right to watch the video on two or more devices simultaneously.

Continuing this example, the network service server 116, which is communicating with the mobile device 102 and the other devices, compares a current usage for the unit of content to data associated with the digital rights holder identity to determine whether the digital rights holder identity is associated with the right to receive the unit of content. If the network service server 116 is currently streaming the requested video to the desktop computer, the network service server 116 may not simultaneously stream the requested content to the media player on the mobile device 102 unless the digital rights holder has purchased digital rights for concurrent viewing. In another example, the cell tower server 110, which is communicating with the mobile device 102 and a desktop computer, waits to receive a signal from the desktop computer indicating that the desktop computer is no longer playing the requested video. Upon receiving the signal, the cell tower server 110 provides the video to the mobile device 102 of a digital rights holder without digital rights for concurrent viewing. If a server determines that the digital rights holder identity is associated with a right to currently receive the unit of content, the method continues to box 208. If a server determines that the digital rights holder identity is not associated with a right to currently receive the unit of content, the method returns to box 202 to check for other requests for units of content.

In box 208, the unit of content is provided to the mobile device. For example, the network service server 116 or the cell tower server 110 provides the requested video to the media player on the mobile device 102. The network service server 116 may provide the requested video to the media player on the mobile device 102 by conveying the video from a content provider to the media player on the mobile device 102, such that the network service server 116 does not need to store the requested video.

Figure 3:
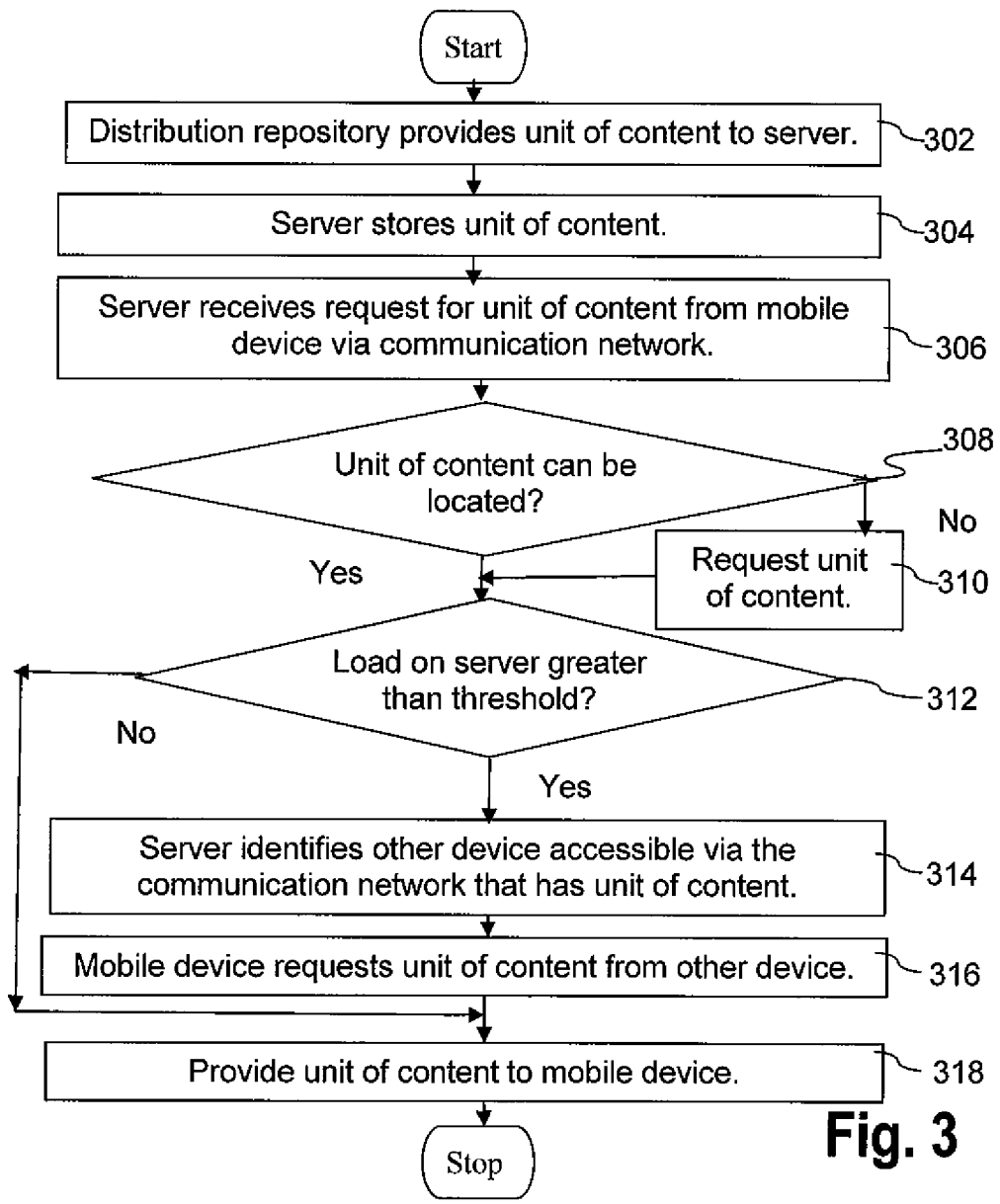
FIG. 3 shows a flowchart of another method for mediating access to content based on digital rights management according to some embodiments of the present disclosure.

FIG. 3 is a flowchart illustrating another method for mediating access to content based on digital rights management according to some embodiments of the present disclosure. The network service server 116 executes the method to receive, store, and provide content for mobile devices.

In box 302, the distribution repository 118 provides a unit of content to a server. For example, the distribution repository 118 provides a music video, previously requested by the cell tower server 110, to the cell tower server 110 via the telecommunication network 114 and the communication link 112, which may be a leased line. Additionally, the distribution repository 118 may provide new releases to the cell tower server 110 or the network service server 116 periodically, as the new releases become available for distribution. The cell tower server 110 may request multiple units of content for each media player serviced by the cell tower server 110. Additionally, the network service server 116 may request multiple units of content for each media player serviced by the network service server 116. The video may be a mainstream new release, for example, a video that was popular when screened in movie theaters and recently made available for downloading. The video may have been requested by numerous media players on a large number of occasions, which may justify requesting such a popular video from the distribution repository 118 via wired communication, such as the communication link 112, which may be a leased line. The video may be a sequel to a popular video that users had requested on a large number of occasions. Due to the desire to avoid providing the content during times when the cell tower server 110 or the distribution repository 118 may have a high communication load, the distribution repository 118 may provide the content to the cell tower server 110 or during off-peak hours, for example between midnight and 4 A.M. on a weekday, or at some other low traffic interval. Likewise, the distribution repository 118 may provide the content to the network service server 116 during off-peak hours. Alternatively, the distribution repository 118 communicates through the network service server 116, the telecommunication network 114, and the communication link 112 to provide a unit of content to the cell tower server 110.

In another example, the distribution repository 118 provides the unit of content to the network service server 116, which will subsequently respond to a request by providing the unit of content via the telecommunication network 114 and the communication link 112 to the requesting mobile device 102. In yet another example, the distribution repository 118 communicates directly through the telecommunication network 114 and the communication link 112 to provide a unit of content to the mobile device 102 without storing the content in the cell tower server 110. However, leased line expenses may incur each time the unit of content is provided via the communication link 112.

In box 304, a server stores the unit of content. For example, the cell tower server 110 or the network service server 116 stores the music video. The cell tower server 110 or the network service server 116 may store many different units of content. Therefore, the cell tower server 110 has content for each mobile device 102 serviced by the cell tower server 110. Likewise, the network service server 116 has content for each mobile device 102 serviced by the network service server 116. After a music video is provided over the communication link 112 to the cell tower server 110, the cell tower server 110 may provide the music video repeatedly to requesting mobile devices 102 without incurring any more expenses for providing the music video via the communication link 112.

In box 306, a server receives a request for a unit of content from a mobile device via a communication network. For example, the cell tower server 110 or the network service server 116 receives a request for a video from the mobile device 102 via the telecommunication network 114. In an embodiment, the media player on the mobile device 102 may cause the mobile device 102 to request the video, for example in response to receiving user control inputs.

In box 308, a server determines whether the unit of content can be located. For example, the cell tower server 110 determines whether the requested video can be located on the cell tower server 110 or on any local wirelessly accessible device 120. Although the cell tower server 110 may store many videos, the cell tower server 110 may not have stored the specific video requested by the mobile device 102. If the cell tower server 110 determines that the content cannot be located on the cell tower server 110 or on any local wirelessly accessible device 120, the method continues to box 310. If the cell tower server 110 determines that the content can be located on the cell tower server 110 or on any local wirelessly accessible device 120, the method proceeds to box 312. Likewise, the network service server 116 may determine whether the requested video can be located on the network service server 116 or on any local wirelessly accessible device 120.

In box 310, a server requests the unit of content. For example, the cell tower server 110 or the network service server 116 requests the video that cannot be located from the distribution repository 118 via a wired communication. In another example, the cell tower server 110 requests the video that cannot be located from another cell tower server 110. If the other cell tower server 110 can provide the requested video to the cell tower server 110, the cell tower server 110 does not have to request the video from the distribution repository 118 via the communication link 112, which can be more expensive using leased lines.

In box 312, a server determines whether a load on the server is greater than a threshold. For example, the network service server 116 determines whether the current load on the network service server 116 is greater than a network service threshold. The network service threshold indicates whether the network service server 116 currently has sufficient available capacity to provide the requested video to the media player without reducing normal network service. If the network service server 116 determines that the load on the network service server 116 is greater than the threshold, the method continues to box 314. If the network service server 116 determines that the load on the network service server 116 is not greater than the threshold, the method proceeds to box 318. Likewise, the cell tower server 110 may determine whether the current load on the cell tower server 110 is greater than a cell tower threshold.

In box 314, a server identifies a wirelessly accessible device 120 that has the unit of content. For example, the cell tower server 110 or the network service server 116, which is too busy to provide the requested video to the mobile device 102, identifies a wirelessly accessible device 120 that has previously stored the requested video. If the network service server 116 provided the requested video to a specific wirelessly accessible device 120, but digital rights holder identity for the specific wirelessly accessible device 120 is not associated with the right to store the requested video, the network service server 116 does not identify the specific wirelessly accessible device 120 as having the requested video. The cell tower server 110 or the network service server 116 provides an internet protocol address or the telephone number (numbering plan area or NPA) for the device 120 that received the video to the mobile device 102. The wirelessly accessible device 120 is served by the same base transceiver station, such as the cell tower 108, which serves the mobile device 102. When the network service server 116 is too busy to provide content to the mobile device 102, the network service server 116 can identify the wirelessly accessible device 120 that can provide the same content to the mobile device 102. Likewise, when the cell tower server 110 is too busy to provide content to the mobile device 102, the cell tower server 110 can identify the wirelessly accessible device 120 that can provide the same content to the mobile device 102.

In box 316, the mobile device 102 requests the unit of content from the wirelessly accessible device 120. In an embodiment, the media player on the mobile device 102 may cause the mobile device 102 to request the unit of content, for example in response to user control inputs. For example, the mobile device 102 uses the internet protocol address or telephone number for the wirelessly accessible device 120 to request the video from the wirelessly accessible device 120. In some embodiments, the wirelessly accessible device 120 may provide the requested unit of content via direct wireless communication to the mobile device 102, for example, using Wi-Fi communications. The network service server 116 or the cell tower server 110 may no longer need to store certain content once a sufficient number of wirelessly accessible devices have downloaded the content because at least some of the wirelessly accessible devices may be expected to be available for providing the popular content to any requesting mobile devices.

In box 318, the unit of content is provided to the mobile device 102. For example, the network service server 116 or the cell tower server 110 provides the requested video to the mobile device 102. In another example, the wirelessly accessible mobile device 120 provides the requested video to the mobile device 102 via a communication network.

Figure 4:
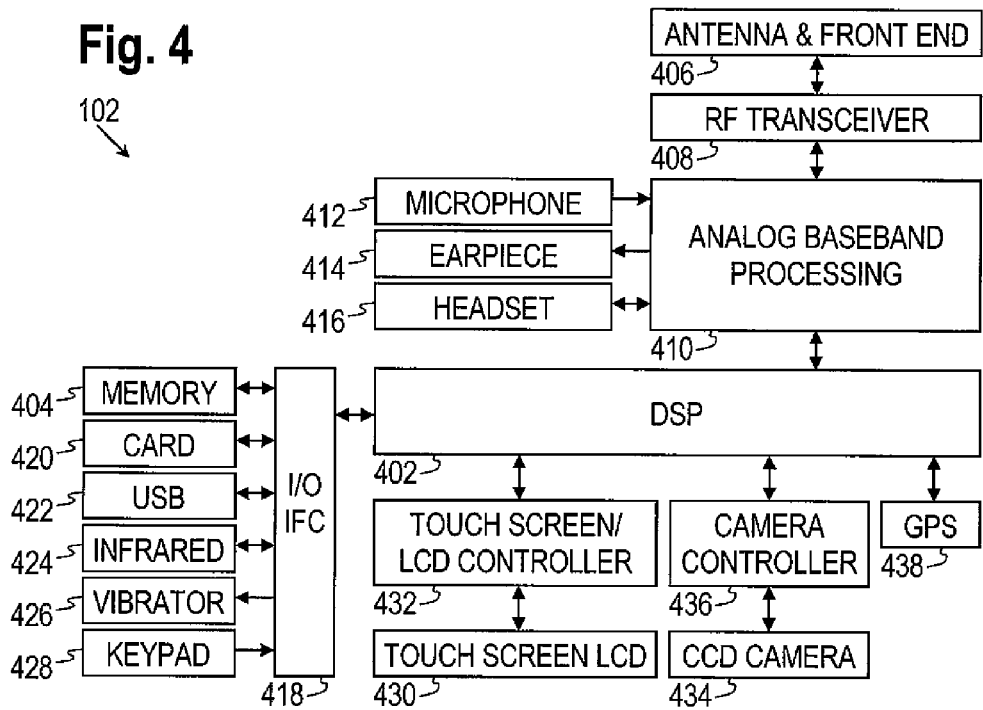
FIG. 4 shows a block diagram of an illustrative mobile device.

FIG. 4 shows a block diagram of the mobile device or handset 102. While a variety of known components of handsets 102 are depicted, in an embodiment a subset of the listed components and/or additional components not listed may be included in the handset 102. The handset 102 includes a digital signal processor (DSP) 402 and a memory 404. As shown, the handset 102 may further include an antenna and front end unit 406, a radio frequency (RF) transceiver 408, an analog baseband processing unit 410, a microphone 412, an earpiece speaker 414, a headset port 416, an input/output interface 418, a removable memory card 420, a universal serial bus (USB) port 422, an infrared port 424, a vibrator 426, a keypad 428, a touch screen liquid crystal display (LCD) with a touch sensitive surface 430, a touch screen/LCD controller 432, a charge-coupled device (CCD) camera 434, a camera controller 436, and a global positioning system (GPS) sensor 438. In an embodiment, the handset 102 may include another kind of display that does not provide a touch sensitive screen. In an embodiment, the DSP 402 may communicate directly with the memory 404 without passing through the input/output interface 418.

The DSP 402 or some other form of controller or central processing unit operates to control the various components of the handset 102 in accordance with embedded software or firmware stored in memory 404 or stored in memory contained within the DSP 402 itself. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 may be provided to convert between wireless signals and electrical signals, enabling the handset 102 to send and receive information from a cellular network or some other available wireless communications network or from a peer handset 102. In an embodiment, the antenna and front end unit 406 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 406 may include antenna tuning and/or impedance matching components, RF power amplifiers, and/or low noise amplifiers.

The RF transceiver 408 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 410 and/or the DSP 402 or other central processing unit. In some embodiments, the RF Transceiver 408, portions of the antenna and front end 406, and the analog baseband processing unit 410 may be combined in one or more processing units and/or application specific integrated circuits (ASICs).

The analog baseband processing unit 410 may provide various analog processing of inputs and outputs, for example analog processing of inputs from the microphone 412 and the headset 416 and outputs to the earpiece speaker 414 and the headset 416. To that end, the analog baseband processing unit 410 may have ports for connecting to the built-in microphone 412 and the earpiece speaker 414 that enable the handset 102 to be used as a cell phone. The analog baseband processing unit 410 may further include a port for connecting to a headset or other hands-free microphone and speaker configuration. The analog baseband processing unit 410 may provide digital-to-analog conversion in one signal direction and analog-to-digital conversion in the opposing signal direction. In some embodiments, at least some of the functionality of the analog baseband processing unit 410 may be provided by digital processing components, for example by the DSP 402 or by other central processing units.

The DSP 402 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 402 may perform modulation, coding, interleaving, and spreading, and for a receiver function the DSP 402 may perform despreading, deinterleaving, decoding, and demodulation. In another embodiment, for example in an orthogonal frequency division multiplex access (OFDMA) technology application, for the transmitter function the DSP 402 may perform modulation, coding, interleaving, inverse fast fourier transforming, and cyclic prefix appending, and for a receiver function the DSP 402 may perform cyclic prefix removal, fast fourier transforming, deinterleaving, decoding, and demodulation. In other wireless technology applications, yet other signal processing functions and combinations of signal processing functions may be performed by the DSP 402.

The DSP 402 may communicate with a wireless network via the analog baseband processing unit 410. In some embodiments, the communication may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB interface 422 and the infrared port 424. The USB interface 422 may enable the handset 102 to function as a peripheral device to exchange information with a personal computer or other computer system. The infrared port 424 and other optional ports such as a Bluetooth interface or an IEEE 802.11 compliant wireless interface may enable the handset 102 to communicate wirelessly with other nearby handsets and/or wireless base stations.

The input/output interface 418 may further connect the DSP 402 to the vibrator 426 that, when triggered, causes the handset 102 to vibrate. The vibrator 426 may serve as a mechanism for silently alerting the user to any of various events such as an incoming call, a new text message, and an appointment reminder.

The keypad 428 couples to the DSP 402 via the interface I/O 418 to provide one mechanism for the user to make selections, enter information, and otherwise provide input to the handset 102. Another input mechanism may be the touch screen LCD 430, which may also display text and/or graphics to the user. The touch screen LCD controller 432 couples the DSP 402 to the touch screen LCD 430.

The CCD camera 434 enables the handset 102 to take digital pictures. The DSP 402 communicates with the CCD camera 434 via the camera controller 436. The GPS sensor 438 is coupled to the DSP 402 to decode global positioning system signals, thereby enabling the handset 102 to determine its position. In another embodiment, a camera operating according to a technology other than Charge Coupled Device cameras may be employed. Various other peripherals may also be included to provide additional functions, e.g., radio and television reception.

Figure 5:
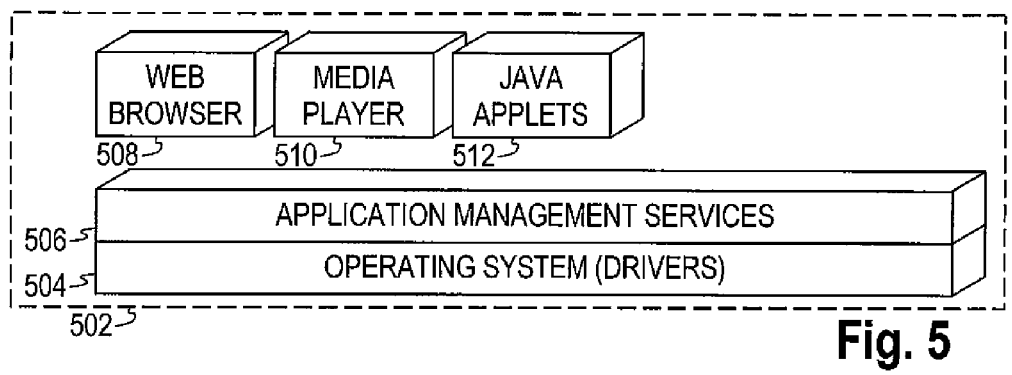
FIG. 5 shows a block diagram of an illustrative software configuration for a mobile device.

FIG. 5 illustrates a software environment 502 that may be implemented by the DSP 402. The DSP 402 executes operating system drivers 504 that provide a platform from which the rest of the software operates. The operating system drivers 504 provide drivers for the handset hardware with standardized interfaces that are accessible to application software. The operating system drivers 504 include application management services ("AMS") 506 that transfer control between applications running on the handset 102. Also shown in FIG. 5 are a web browser application 508, a media player application 510, and JAVA applets 512. The web browser application 508 configures the handset 102 to operate as a web browser, allowing a user to enter information into forms and select links to retrieve and view web pages. The media player application 510 configures the handset 102 to retrieve and play audio or audiovisual media. The JAVA applets 512 configure the handset 102 to provide games, utilities, and other functionality.

Figure 6:
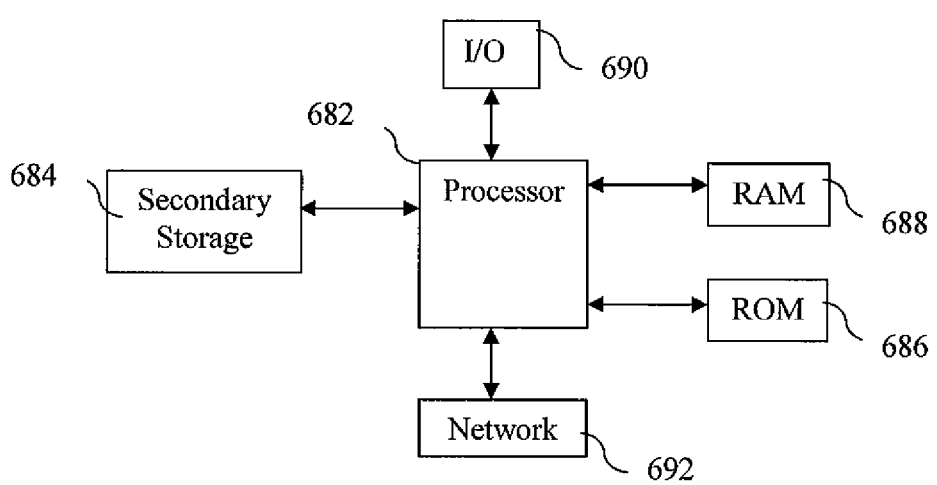
FIG. 6 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 6 illustrates a typical, general-purpose computer system, such as the network service server 116 server, suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor may be implemented as one or more CPU chips.

The secondary storage 684 is typically comprised of one or more disk drives or tape drives and is used for non-volatile storage of data and as an over-flow data storage device if the RAM 688 is not large enough to hold all working data. Secondary storage 684 may be used to store programs which are loaded into the RAM 688 when such programs are selected for execution. The ROM 686 is used to store instructions and perhaps data which are read during program execution. The ROM 686 is a non-volatile memory device which typically has a small memory capacity relative to the larger memory capacity of secondary storage. The RAM 688 is used to store volatile data and perhaps to store instructions. Access to both the ROM 686 and the RAM 688 is typically faster than to the secondary storage 684.

The I/O devices 690 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 692 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), worldwide interoperability for microwave access (WiMAX), and/or global system for mobile communications (GSM) radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using the processor 682, may be received from and outputted to the network, for example, in the form of a computer data signal embodied in a carrier wave.

Such information, which may include data or instructions to be executed using the processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered the secondary storage 684), the ROM 686, the RAM 688, or the network connectivity devices 692.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A computer implemented method for mediating access to content based on digital rights management, comprising:
   receiving, at a server, a unit of content from a distribution repository, wherein a time for receiving the unit of content from the distribution repository is based on a communication load;
   storing the unit of content on the server;
   receiving a request from a mobile device for the unit of content;
   identifying a digital rights holder identity for the mobile device by using a unique identifier for the mobile device, wherein the unique identifier is at least one of an equipment identifier that is a cellular radio unique identifier for the mobile device, an international mobile subscriber identity, a mobile subscriber identification number, and a mobile identification number;
   determining whether the digital rights holder identity is associated with a right to receive the unit of content;
   providing, from the server, the unit of content to the mobile device in response to a determination that the digital rights holder identity is associated with the right to receive the unit of content.

2. The computer implemented method of claim 1, wherein the unit of content is multimedia content, an audio content, a video content, a still image content, and a text content.

3. The computer implemented method of claim 1, wherein the digital rights holder identity is associated with a plurality of devices.

4. The computer implemented method of claim 1, wherein determining whether the digital rights holder identity is associated with the right to receive the unit of content comprises comparing the request from the mobile device for the unit of content to data associated with the digital rights holder identity, wherein the data associated with the digital rights holder identity comprises a plurality of linked content identifier and rights definition pairs, and wherein each rights definition restricts providing the unit of content to a maximum number of devices.

5. The computer implemented method of claim 1, wherein the time for receiving the unit of content from the distribution repository is during off-peak hours.

6. A system for mediating access to content based on digital rights management, comprising:
   a server comprising a processor and a non-transitory computer readable medium, wherein the server is configured to:
   receive a request from a media player for a unit of content,
   identify a digital rights holder identity associated with the request by using a unique identifier for the media player, wherein the unique identifier is at least one of an equipment identifier, an international mobile subscriber identity, a mobile subscriber identification number, and a mobile identification number,
   determine whether the digital rights holder identity is associated with a right to receive the unit of content,
   identify a wirelessly accessible device that is accessible via a communication network that has the unit of content and is associated with a right to store the unit of content;
   receive the unit of content from the wirelessly accessible device in response to a request for the unit of content received from the media player; and
   provide the unit of content to the media player in response to a determination that the digital rights holder identity is associated with the right to receive the unit of content, wherein the unit of content is not stored on the server.

7. The system of claim 6, wherein the server and the media player communicate via a base transceiver station.

8. The system of claim 6, wherein the media player is one of a mobile telecommunication device, a mobile handset, a personal digital assistant, a mobile computer, a handheld gaming device, a wireless mobile device, a pager, a portable computer, a tablet computer, a laptop computer, a set top box, a television, a digital camera, a digital music player, and a digital calculator.

9. The system of claim 6, wherein identify a wirelessly accessible device comprises providing at least one of an internet protocol address and numbering plan area number for the wirelessly accessible device from which the server receives the unit of content.

10. A computer implemented method for mediating access to content based on digital rights management, comprising:
    a distribution repository providing a unit of content to a server during off-peak hours;
    the server storing the unit of content in response to the unit of content being requested on more than a specified number of occasions;
    the server receiving a request for the unit of content from a mobile device via a communication network; and
    the server providing the unit of content to the mobile device based on a digital rights holder identity.

11. The computer implemented method of claim 10, further comprising:
    the server determining whether a load on the server is greater than a threshold in response to receiving a request for the unit of content from a mobile device; and
    the server providing the unit of content from the server to the mobile device in response to determining that the load on the server is not greater than the threshold.

12. The computer implemented method of claim 11, further comprising:
    the server identifying an other device accessible via the communication network that has the unit of content in response to determining that the load on the server is greater than the threshold;
    the mobile device requesting the unit of content from the other device; and
    the other device providing the unit of content to the mobile device via the communication network.

13. The computer implemented method of claim 12, wherein identifying the other device that has the unit of content comprises providing at least one of an internet protocol address and numbering plan area number for the other device that provides the content to the mobile device.

14. The computer implemented method of claim 12, wherein the other device is served by a base transceiver station that serves the mobile device.

15. The computer implemented method of claim 10, further comprising:
    the server determining whether the unit of content can be located; and
    the server requesting the unit of content from the distribution repository via a wired communication in response to a determination that the unit of content cannot be located.

16. The computer implemented method of claim 10, further comprising:
    the server determining whether the unit of content can be located; and
    the server requesting the unit of content from another server via the communication network in response to a determination that the unit of content cannot be located.

17. The computer implemented method of claim 10, wherein the distribution repository provides the unit of content to the server via a wired communication.

18. The computer implemented method of claim 10, wherein the unit of content is a new release.

19. The computer implemented method of claim 10, wherein the server communicates with the communication network via wireless communication.

20. The computer implemented method of claim 10, wherein the unit of content is multimedia content, an audio content, a video content, a still image content, and a text content.

* * * * *